(No Model.)
2 Sheets—Sheet 1.
I. L. ROBERTS.
ELECTRIC BATTERY.
No. 314,722.  Patented Mar. 31, 1885.
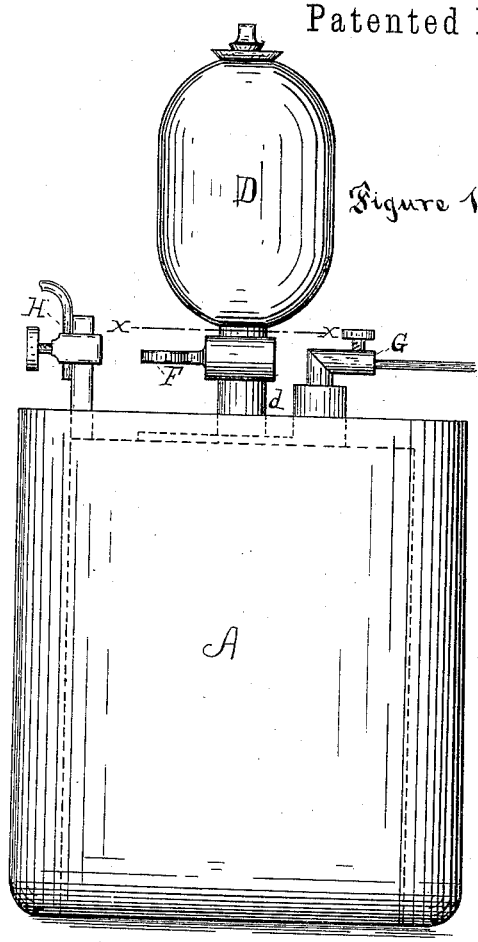
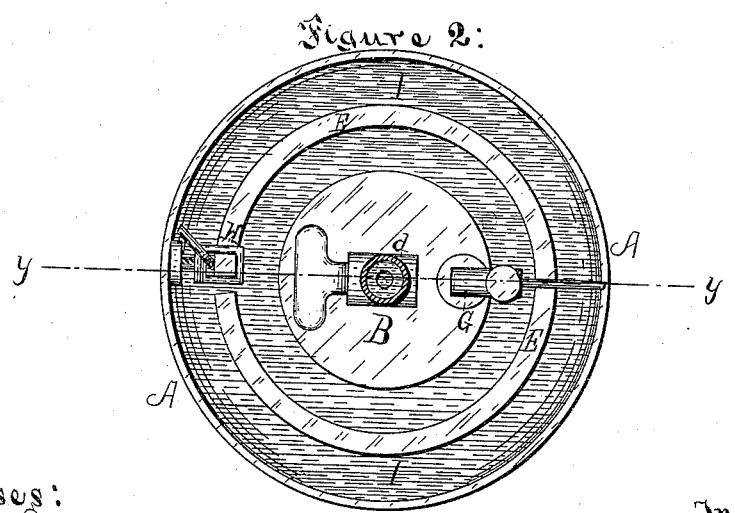
Witnesses:
Joseph L. Levy
A. J. Lehman
Inventor:
Isaiah L. Roberts
by his atty
Henry L. Brevard

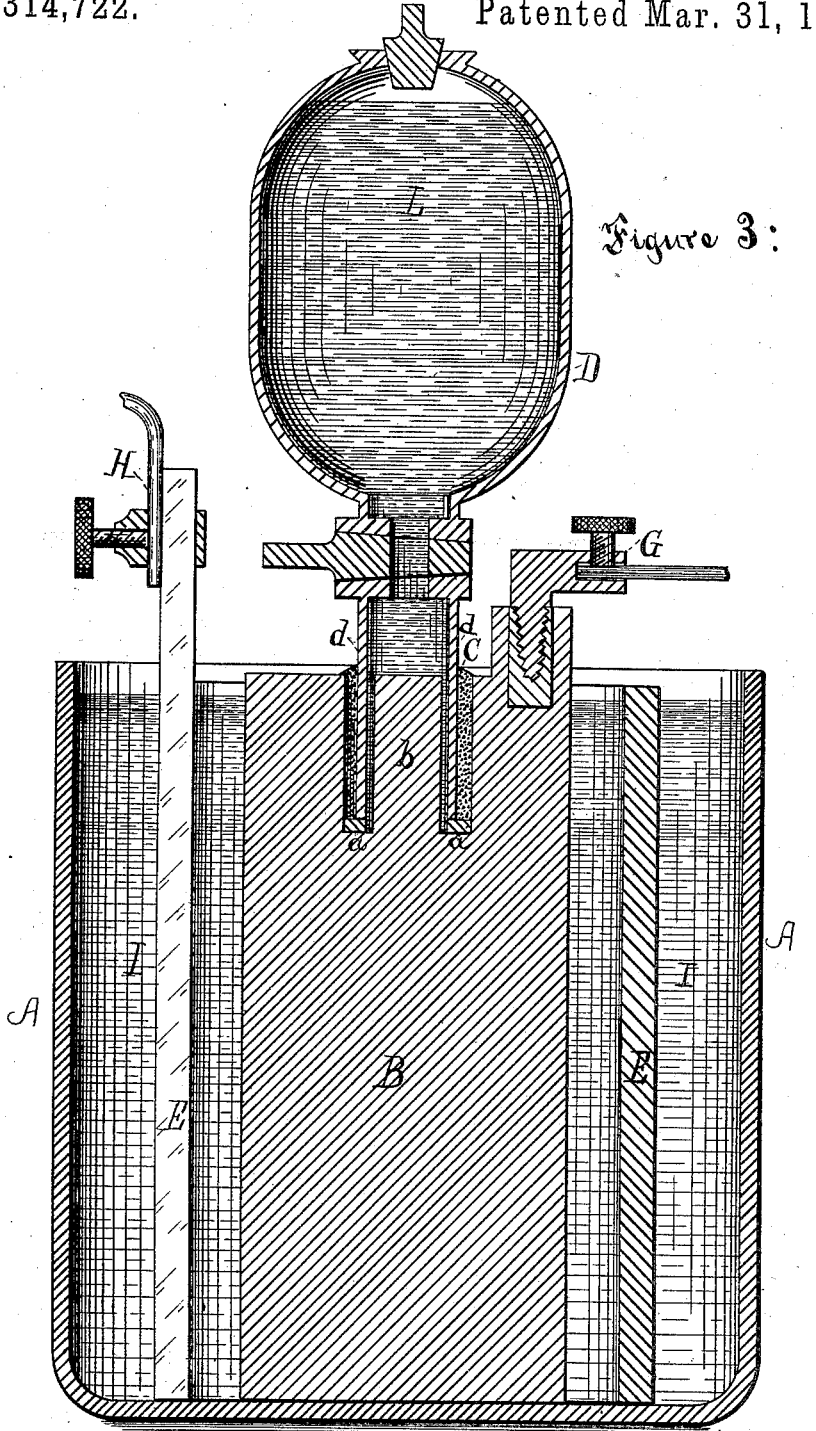

United States Patent Office.

ISAIAH L. ROBERTS, OF BROOKLYN, NEW YORK.

ELECTRIC BATTERY.

SPECIFICATION forming part of Letters Patent No. 314,722, dated March 31, 1885.

Application filed April 24, 1884. (No model.)

*To all whom it may concern:*

Be it known that I, ISAIAH L. ROBERTS, of Brooklyn, in Kings county, and State of New York, have invented a certain new and useful Improvement in Electric Batteries, of which the following is a specification.

I will describe a battery embodying my improvement, and then point out the various features in claims.

In the accompanying drawings, Figure 1 is a side view. Fig. 2 is a top view, the upper part of a reservoir or liquid-holder which is comprised in the battery being cut away, on the line $x\ x$, Fig. 1; and Fig. 3 is an enlarged section taken on the line $y\ y$, Fig. 2.

A designates a cell of glass or the like.

B designates a round body of carbon, which forms the negative element of the battery, and in the present instance is made in the form of a cylinder, and has a hole, C, in the center of its upper portion.

Fastened to the carbon B is a reservoir or liquid-holder, D, which may be made of glass, and has a cock, F, whereby the flow of liquid from the reservoir or liquid-holder to the carbon B may be controlled. The reservoir or liquid-holder D has a hole at the top through which it may be filled. This hole is preferably provided with a stopper.

G designates an electric conductor, which may be made of metal, and leads from the carbon B.

I find that the best way to attach the conductor to the carbon is to make a cavity in the carbon and to cast therein type-metal, preferably mixed with an additional quantity of antimony or bismuth, so as to make it expand in cooling. While this is still in the liquid state, the clamp of the conductor is plunged into it and held in position until the metal cools and hardens around it. I have already filed an application for this method of making a connection between the carbon and the conductor, and therefore I do not here claim the same.

E designates a plate of zinc, shown as bent into circular form, and forms the positive element of the battery.

H designates an electric conductor, which is attached in any well-known way to the zinc E. The solution I surrounds the carbon and zinc, and is preferably, but not necessarily, chloride of sodium dissolved in water.

The reservoir or liquid-holder D is preferably filled with nitric acid, and the cock F opened or partly opened to admit the acid to the interior of the carbon B. When this is done and the acid and the saline solutions have met, the chloride of sodium will be decomposed, and the zinc will unite with the chlorine thus liberated.

My carbon is best made in the form of a round body, with the opening for the reception of acid at the center of the carbon, for then there is the same or about the same distance from the opening in every direction for the acid to travel before it arrives at the exterior surface of the carbon, and this is advantageous. The harder the carbon the thinner may be the walls through which the acid has to pass. This must be adjusted for each situation in which the battery is to be used. If an open-circuit battery is to be made, a comparatively thick-walled and hard or dense carbon should be used; but if steady closed-circuit work is required of the battery then the walls of the carbon as to thickness and density must be adjusted so as to admit the right quantity of acid to filter through to do the work required. No rule can be given for this detail.

I prefer to attach the reservoir or liquid-holder D to the carbon in the following manner: An annular hole is made in the carbon, and a washer of rubber or other suitable material, $a$, is dropped to the bottom of this hole, or surrounds the bottom of the neck of the reservoir. The interior diameter of this neck $d$ is made somewhat larger than the exterior diameter of the portion $b$ of the carbon, and the exterior diameter of the neck of the vessel is made somewhat smaller than the greatest diameter of the annular hole in the carbon. The annular passage thus left between the portion $b$ of the carbon and the interior of the neck serves as a channel for the acid to flow downward, while around the exterior of the neck and the outer walls of the hole I cast paraffine, as shown at $c$. Thus, by means of the washer $a$ and the paraffine $c$, I am enabled to keep the acid from flowing up around the outside of the neck. It also makes the reservoir containing the acid fast in the annular opening in the carbon. In many cases I might alter the shape of the reservoir or liquid-holder D. The cock F can be replaced by substituting for it a suitable opening in the lower end of the reservoir or liquid-holder.

I am well aware that it is very old to use a cell in which there was a zinc positive element and a hollow carbon forming the negative element; but the carbon has never to my knowledge, prior to my invention, had combined with it a reservoir or liquid-holder made of impervious material from which liquid cannot pass out, except through that part of the carbon which is intended to be immersed in liquid contained in the cell of the battery.

I believe it to be new to feed liquid gradually from a reservoir or holder made of impervious material, and arranged above the level of liquid located outside the carbon in the cell into the carbon, and to pevent its escape from the carbon except through the pores of the carbon. I therefore believe this, broadly considered, to constitute my invention.

I hereby reserve the right to claim in another application all the novel features of my invention, except those mentioned in the following claims.

What I claim as my invention, and desire to secure by Letters Patent, is—

1. A battery carbon and a reservoir or liquid-holder arranged at the upper portion of said carbon and communicating with the pores or interstices of the carbon.

2. A battery element of carbon, an attached reservoir or liquid-holder, and a controlling-cock between the reservoir or liquid-holder and the carbon, to regulate and control the supply of fluid from the reservoir to the carbon.

3. A battery element consisting of a carbon and an attached elevated reservoir united by a substance which adheres to both.

4. A battery element consisting of a carbon and an attached reservoir united by inserting the neck of the reservoir into a hole in the carbon, and then forming the union by packing the space between the exterior of the neck and the interior of the carbon-hole.

ISAIAH L. ROBERTS.

Witnesses:
A. J. LEHMAN.
B. T. VETTERLEIN.